(12) United States Patent
Chopra et al.

(10) Patent No.: US 12,271,907 B2
(45) Date of Patent: Apr. 8, 2025

(54) SYSTEM AND METHOD FOR IDENTIFYING AND REMEDIATING UNANSWERED QUERIES IN APPLICATION RESOLUTION REPORTS

(71) Applicant: EMC IP Holding Company LLC, Hopkinton, MA (US)

(72) Inventors: Shelesh Chopra, Bangalore (IN); Vasanth D. Sathyanaraya, Bangalore (IN); Parminder Singh Sethi, Punjab (IN); Akanksha Goel, Haryana (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 822 days.

(21) Appl. No.: 17/355,341

(22) Filed: Jun. 23, 2021

(65) Prior Publication Data

US 2022/0383330 A1   Dec. 1, 2022

(30) Foreign Application Priority Data

May 27, 2021  (IN) .............................. 202141023615

(51) Int. Cl.
*G06Q 30/016*   (2023.01)
*G06F 16/903*   (2019.01)
(Continued)

(52) U.S. Cl.
CPC ..... *G06Q 30/016* (2013.01); *G06F 16/90335* (2019.01); *G06F 40/289* (2020.01); *G06N 3/02* (2013.01); *G06Q 10/10* (2013.01)

(58) Field of Classification Search
CPC ................. G06Q 30/016; G06Q 10/10; G06F 16/90335; G06F 40/289; G06F 40/35; G06N 3/02
See application file for complete search history.

(56) References Cited

U.S. PATENT DOCUMENTS 10,498,751 B2 *  12/2019  Yu ....................... H04L 63/1416
10,699,215 B2 *   6/2020  Devarakonda ......... G06N 5/022
(Continued)

FOREIGN PATENT DOCUMENTS

CN           111966812 A  * 11/2020
WO    WO-2019235103 A1  * 12/2019  ....... G06F 16/90332

OTHER PUBLICATIONS

Finding unanswered question with SQL (Year: 2014).*
Neural network based approach for question answering (Year: 2019).*

*Primary Examiner* — Sangeeta Bahl
(74) *Attorney, Agent, or Firm* — Chamberlain, Hrdlicka, White, Williams & Aughtry; Aly Z. Dossa

(57) ABSTRACT

A method for managing applications includes obtaining an application resolution report from an administrative system, wherein the application resolution report comprises a customer query and a response, applying a neural network algorithm on a set of tokens associated with the application resolution report to obtain a vector representation of the application resolution report, performing a probability analysis on each vector in the vector representation, based on the probability analysis, identifying an unanswered portion of the application resolution report, and in response to the unanswered portion of the application resolution report, performing a query resolution.

11 Claims, 5 Drawing Sheets

(51) Int. Cl.
*G06F 40/289* (2020.01)
*G06N 3/02* (2006.01)
*G06Q 10/10* (2023.01)

(56) References Cited

U.S. PATENT DOCUMENTS

| | | | | |
|---|---|---|---|---|
| 10,902,737 | B2* | 1/2021 | Tapuhi | G09B 7/00 |
| 10,970,319 | B2* | 4/2021 | Bansal | G06F 16/313 |
| 11,244,167 | B2* | 2/2022 | Zhao | G06N 3/08 |
| 11,710,080 | B2* | 7/2023 | Zhang | G06Q 10/0639 |
| | | | | 705/2 |
| 2017/0364593 | A1* | 12/2017 | Busey | G06Q 50/01 |
| 2020/0159778 | A1* | 5/2020 | Mohanty | G06Q 30/0282 |
| 2022/0327287 | A1* | 10/2022 | Agrawal | G06F 40/216 |

\* cited by examiner

SYSTEM AND METHOD FOR IDENTIFYING AND REMEDIATING UNANSWERED QUERIES IN APPLICATION RESOLUTION REPORTS

BACKGROUND

Computing devices in a system may include any number of internal components such as processors, memory, and persistent storage. As computing devices experience failures, internal or external systems may track undesirable behaviors by applications executed using the internal components.

SUMMARY

In general, in one aspect, the invention relates to a method for managing an application of a production host environment. The method includes obtaining an application resolution report from an administrative system, wherein the application resolution report comprises a customer query and a response, applying a neural network algorithm on a set of tokens associated with the application resolution report to obtain a vector representation of the application resolution report, performing a probability analysis on each vector in the vector representation, based on the probability analysis, identifying an unanswered portion of the application resolution report, and in response to the unanswered portion of the application resolution report, performing a query resolution.

In general, in one aspect, the invention relates to a non-transitory computer readable medium that includes instructions computer readable program code, which when executed by a computer processor enables the computer processor to perform a method for managing applications. The method includes obtaining an application resolution report from an administrative system, wherein the application resolution report comprises a customer query and a response, applying a neural network algorithm on a set of tokens associated with the application resolution report to obtain a vector representation of the application resolution report, performing a probability analysis on each vector in the vector representation, based on the probability analysis, identifying an unanswered portion of the application resolution report, and in response to the unanswered portion of the application resolution report, performing a query resolution.

In general, in one aspect, the invention relates to a system that includes a system that includes a processor and memory that includes instructions, which when executed by the processor, perform a method. The method includes obtaining an application resolution report from an administrative system, wherein the application resolution report comprises a customer query and a response, applying a neural network algorithm on a set of tokens associated with the application resolution report to obtain a vector representation of the application resolution report, performing a probability analysis on each vector in the vector representation, based on the probability analysis, identifying an unanswered portion of the application resolution report, and in response to the unanswered portion of the application resolution report, performing a query resolution.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
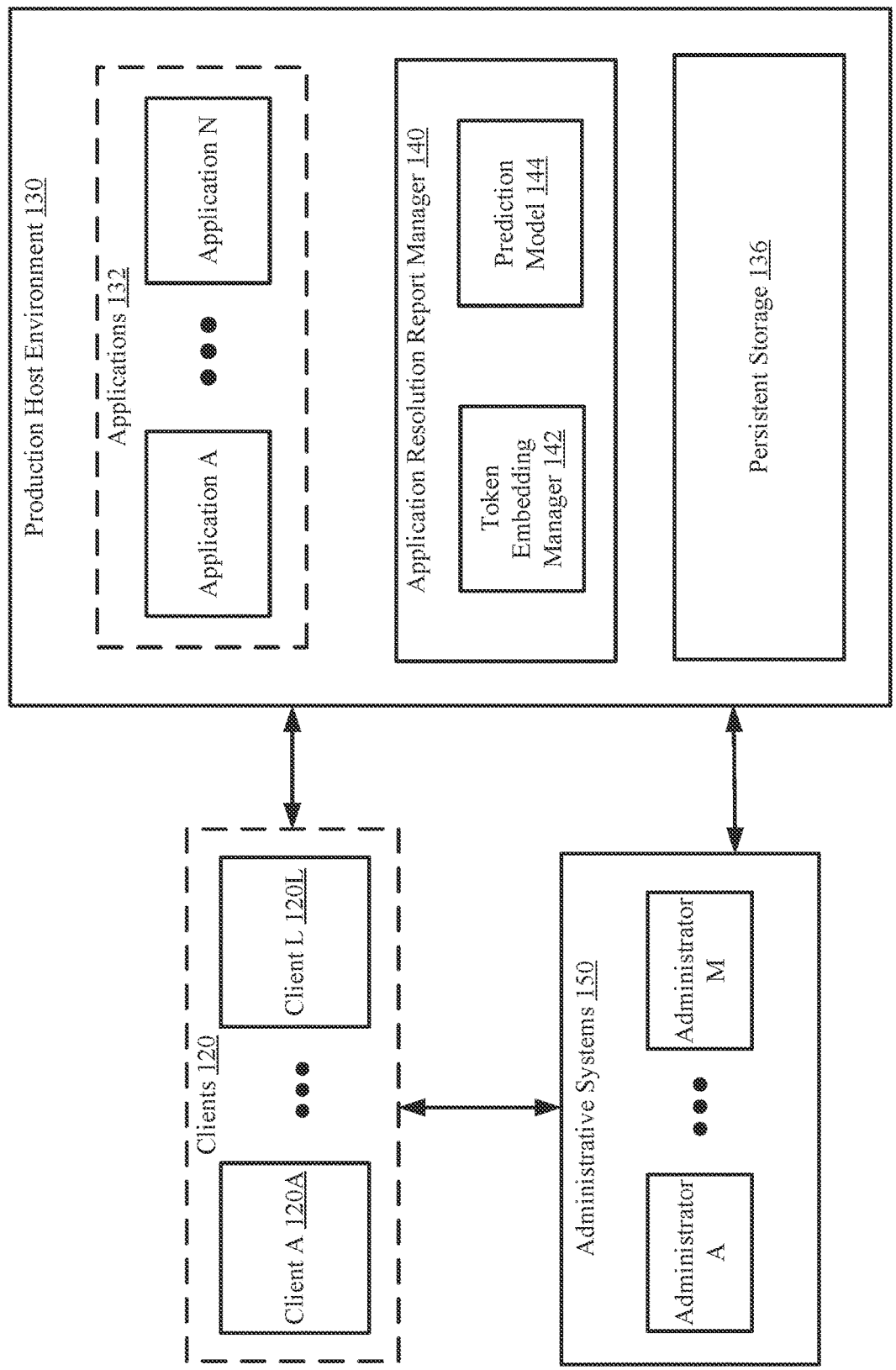
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing a customer environment. Specifically, embodiments of the invention relate to methods for managing customer queries sent to administrative systems managed by administrators. Embodiments of the invention may evaluate application resolution reports that include both the customer queries and the response provided by an administrator of the administrative system.

In one or more embodiments, the customer query may be generated in response to an issue in the customer environment. The customer environment may include any number of client devices, and each client device may operate one or more applications. The issue specified in the customer query may correspond to an issue with any combination of: a client device, an application operating in a client device, network connectivity between client devices and/or between applications, and/or network connectivity to external devices. The issue may correspond to any other entity without departing from the invention.

In one or more embodiments of the invention, the customer query may be generated in response to a desire by the user to obtain information that may be provided by the administrative system. The information may correspond to the client devices, the applications executing in the client devices (and/or to be executed in the client devices in the future), and/or the network connectivity between the client devices, applications, and/or external devices.

In one or more embodiments of the invention, the response may be generated by the administrator in an attempt to provide the requested information and/or resolution to an issue. Though the response is generated by a knowledgeable administrator, it is possible that the provided answer may lack a complete response to every portion of the query. Because of this possibility, an identification of any unanswered portions of a query may result in unresolved queries.

To remediate this possibility, embodiments of the invention include performing the application resolution report analysis. The application resolution report analysis may be performed by applying a neural network algorithm to the application resolution report to output a detection of unanswered portions of the query. The neural network algorithm may include any number of iterations that each include at least the following stages: a word embedding stage, a segment embedding stage, a position embedding stage, a transformation to attention head function, a masked language model stage, and a next sentence prediction stage.

FIG. 1 shows an example system in accordance with one or more embodiments of the invention. The system includes one or more clients (120), a production host environment (130) and an administrative system (150). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the clients (120) utilize the services provided by the applications (132) in the production host environment (PHE) (130). The clients (120) may further manage the upgrades of the applications (132). Each client (120A, 120L) may communicate with the administrative system (150) to send queries and/or to receive responses to the queries. The queries (also referred to as customer queries) and the responses may be collectively referred to as an application resolution report.

As discussed above, the customer query may be generated in response to an issue in the customer environment. The customer environment may include any number of client devices, and each client device may operate one or more applications. The issue specified in the customer query may correspond to an issue with any combination of: a client device, an application operating in a client device, network connectivity between client devices and/or between applications, and/or network connectivity to external devices. The issue may correspond to any other entity without departing from the invention.

In one or more embodiments of the invention, the customer query may be generated in response to a desire by the user to obtain information that may be provided by the administrative system. The information may correspond to the client devices, the applications executing in the client devices (and/or to be executed in the client devices in the future), and/or the network connectivity between the client devices, applications, and/or external devices.

In one or more embodiments of the invention, the response may be generated by the administrator in an attempt to provide the requested information and/or resolution to an issue. Though the response is generated by a knowledgeable administrator, it is possible that the provided answer may lack a complete response to every portion of the query. Because of this possibility, an identification of any unanswered portions of a query may result in unresolved queries.

Figure 4:
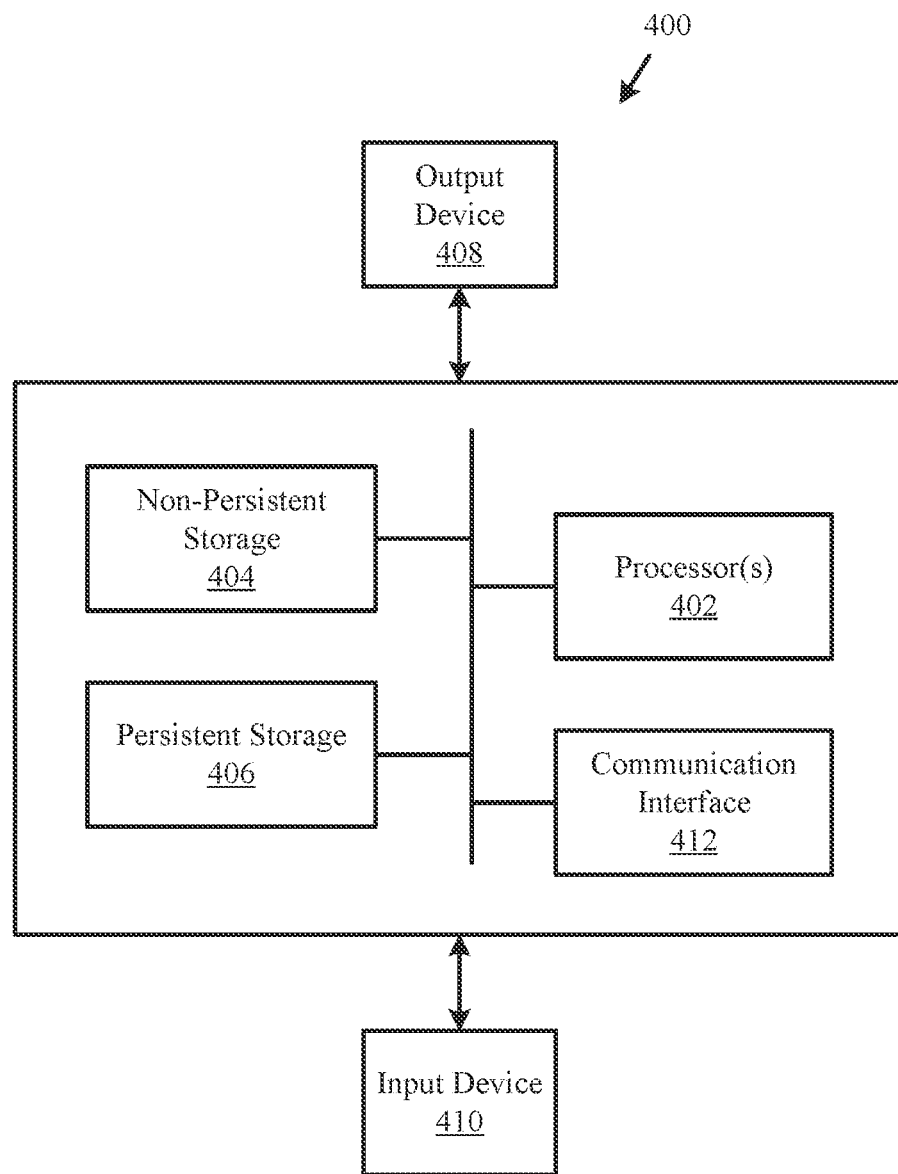
FIG. 4 shows a diagram of a computing device in accordance with one or more embodiments of the invention.

In one or more embodiments of the invention, each client (120A, 120L) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of each client (120A, 120L) described throughout this application.

In one or more embodiments of the invention, each client (120A, 120L) is implemented as a logical device. The logical device may utilize the computing resources of any number of computing devices and thereby provide the functionality of the client (120A, 120L) described throughout this application and/or all, or a portion thereof, of the methods illustrated in FIGS. 2A-2B.

In one or more embodiments of the invention, the production host environment (130) hosts applications (132). The applications (142) may be logical entities executed using computing resources (not shown) of the production host environment (130). Each of the applications may be performing similar or different processes. In one or more embodiments of the invention, the applications (132) provide services to users, e.g., clients (not shown). For example, the applications (132) may host components. The components may be, for example, instances of databases, email servers, and/or other components. The applications (132) may host other types of components without departing from the invention.

In one or more of embodiments of the invention, the applications (132) are implemented as computer instructions, e.g., computer code, stored on a persistent storage (e.g., 134) that when executed by a processor(s) of the production host environment (130) cause the production host environment (130) to provide the functionality of the applications (132) described throughout this application.

In one or more embodiments of the invention, the production host environment (130) further includes an application resolution report manager (140). In one or more embodiments of the invention, the application resolution report manager (140) manages application resolution reports. To perform this functionality, the application resolution report manager (140) includes a token embedding manager (142) and a prediction model (144). The token embedding manager (142) may apply a token embedding on the application resolution reports to obtain a set of tokens for each word in the application resolution report. The token embedding may be performed in accordance with FIG. 2A. Further, the prediction model (144) may apply a neural network algorithm to the set of tokens to obtain a vector representation of the application resolution report. The vector representation may be used to determine whether a portion of the query specified in the application resolution report is not answered in the response of the application resolution report. The application resolution report manager (140) may resolve the unanswered portion of the queries accordingly.

In one or more embodiments of the invention, the application resolution report manager (140) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the application resolution report manager (140) described throughout this application and/or all, or a portion thereof, of the methods illustrated in FIGS. 2A-2B.

In one or more embodiments of the invention, the application resolution report manager (140) is implemented as a logical device. The logical device may utilize the computing resources of any number of computing devices and thereby provide the functionality of the administrative system (150) described throughout this application and/or all, or a portion thereof, of the methods illustrated in FIGS. 2A-2B.

In one or more embodiments of the invention, the production host environment (130) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

In one or more embodiments of the invention, the production host environment (130) is implemented as a logical device. The logical device may utilize the computing resources of any number of computing devices and thereby provide the functionality of the production host environment (130) described throughout this application.

In one or more embodiments of the invention, each of the administrative systems (150) is a system for responding to queries obtained from the clients (120). The administrative system (150) may be operated by one or more operators. The operators may be technical support specialists. The technical support specialists may communicate with the clients (150) to provide the answers (or at least a portion of) to the queries. The combination of a customer query and a corresponding response may collectively be referred to as an application resolution report.

In one or more embodiments of the invention, the administrative system (150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the administrative system (150) described throughout this application.

In one or more embodiments of the invention, the administrative system (150) is implemented as a logical device. The logical device may utilize the computing resources of any number of computing devices and thereby provide the functionality of the administrative system (150) described throughout this application.

Figure 2A:
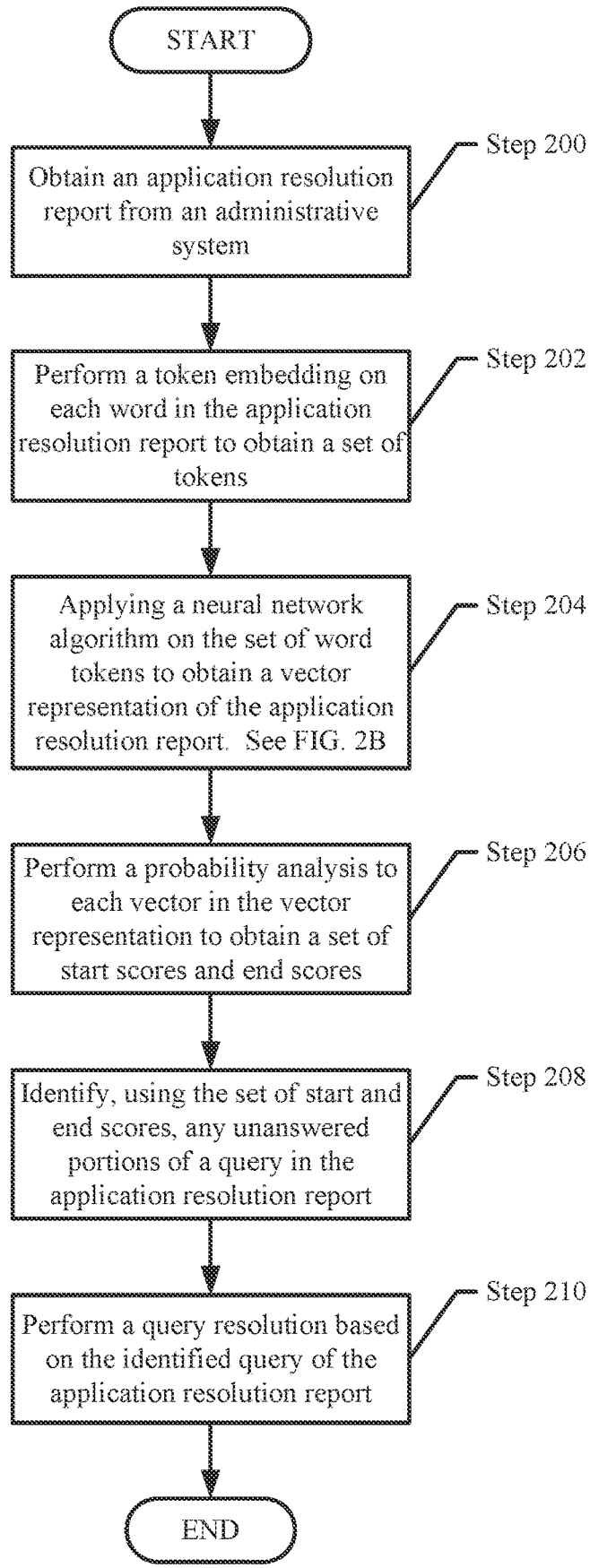
FIG. 2A shows a flowchart for managing an application resolution report in accordance with one or more embodiments of the invention.
Figure 2B:
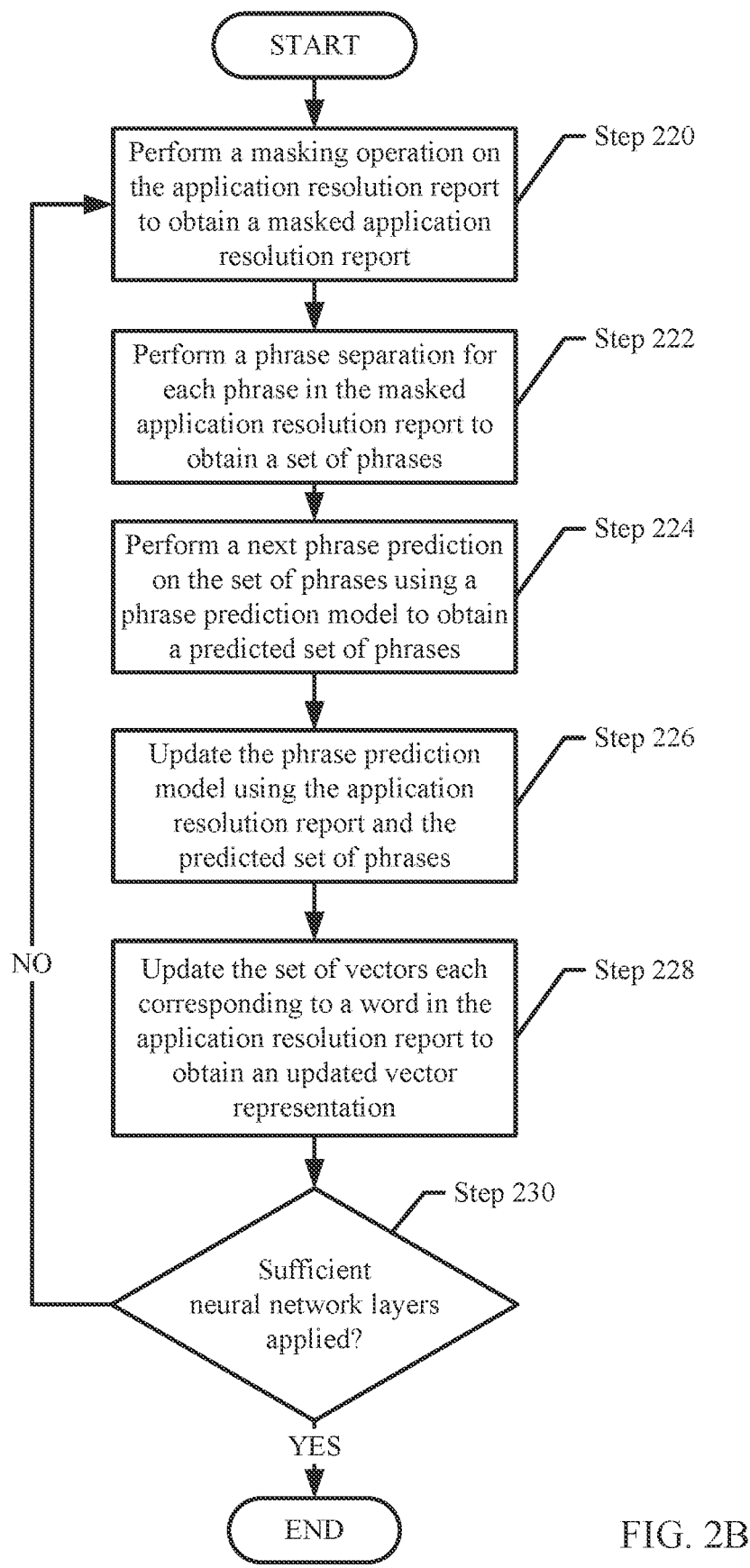
FIG. 2B shows a flowchart for performing a neural network algorithm on a set of tokens in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for processing application resolution reports in accordance with one or more embodiments of the invention. The method shown in FIG. 2A may be performed by, for example, an application resolution report manager (140, FIG. 1). Other components of the system illustrated in FIG. 1 may perform the method of FIG. 2A without departing from the invention.

Turning to FIG. 2A, in step 200, an application resolution report is obtained from an administrative system. As discussed above, the application resolution report includes queries from a client and a response from the administrative system. In one or more embodiments of the invention, the application resolution report is obtained prior to the response of the administrative system being sent to the client.

In step 202, a token embedding is performed on each word in the application resolution report. In one or more embodiments of the invention, the token embedding is a process for embedding additional data associated with each word in the application resolution report. The additional data may be implemented as any combination of data types (e.g., a string, a floating value, an integer, etc.). The token embedding may include a word embedding stage, a segment embedding stage, and a position embedding stage.

In one or more embodiments of the invention, the word embedding stage is an assignment of an identifier to each word in the application resolution report. Each identified word is converted into a word token. The word token may be, for example, any numerical value. The word token may be based on a pre-defined mapping of word-word token pairs. Each word may be assigned to a numerical value based on the corresponding mapping entry.

In one or more embodiments of the invention, for words that are not specified in the mapping, the unspecified word may be sub-divided into sub-words that may be specified in the mapping. Such sub-words may correspond to a word token. Sub-words may be further identified with additional characters. For example, if the word "embedding" is in the application resolution report but not in the mapping, the word may be sub-divided into the following sub-words, with the characters "##" embedded into the sub-words: "##em" "##bed" "##ding". Each sub-word may correspond to a word token based on the mapping. For words that cannot be sub-divided, or for any sub-words that do not correspond to a mapping entry, the mapping may be updated with new mapping entries corresponding to the un-specified words/sub-words.

In one or more embodiments of the invention, the segment embedding stage includes separating the customer query portion of the application resolution report from the response portion using a segment token. The segment (e.g., a [SEP] token). In this manner, the application resolution report manager differentiates the query from the answer text. For example, a first segment token is applied (e.g., "[CLS]") before the first word in the customer query portion, and a second segment token (e.g., "[SEP]") is added before the first word in the answer portion.

In one or more embodiments of the invention, the position embedding stage may include specifying, for each word in the application resolution report, a position relative to the other words. For example, a first word may correspond to a position token of "1", and a second word may correspond to a position token of "2", etc.

In step 204, a neural network algorithm is performed on the set of tokens to obtain a vector representation of the application resolution report. In one or more embodiments of the invention, the neural network algorithm is a method for processing the set of tokens that results in generating a set of vectors that correspond to each word in the application resolution report.

In one or more embodiments of the invention, the neural network algorithm is performed in accordance with FIG. 2A. Other methods may be used to perform the neural network algorithm on the set of tokens without departing from the invention.

In step 206, a probability analysis is performed to each vector in the vector representation to obtain a set of start scores and end scores. The start scores may be a numerical representation of a likelihood that a word represents the start of a customer query. Similarly, the end score is a numerical representation of a likelihood that the word is an end to a portion of a customer query. In one or more embodiments of the invention, the probability analysis is a process for analyzing the vector representations to generate the set of start scores and the set of end scores. The probability analysis may include performing a start function to each vector in the vector representation. The start function may include a ratio between a numerical operation (e.g., multiplied, summed, taken to the power of, etc.) performed on the vector relative to the sum of the operations performed on all vectors in the vector representation. For example, for a start score, a start value may be numerically operated with the vector. The numerical operation may include taking the start value to the power of the vector, and dividing that by the sum of the start values taken over all vectors in the vector representation. The result may be a start score for the corresponding word of the vector. Similarly, the end score may be generated by performing a similar numerical operation using an end value.

In step 208, the start scores and end scores are used to identify any unanswered portions of a query in the application resolution report. In one or more embodiments of the invention, the start scores and end scores are used by identifying a start threshold and an end threshold. For any start scores that exceed a threshold, it may be determined that the word corresponds to the beginning of an unanswered portion of a customer query. Similarly, for any end scores that exceed a threshold, it may be determined that the word corresponds to the end of the unanswered portion. The unanswered portion of the customer query may include the intermediate words between a word with a threshold-exceeding start score and a word with a threshold-exceeding end score.

In step 210, a query resolution is performed based on the identified portion (or portions) of the query. In one or more embodiments of the invention, the query resolution includes sending a notification to the administrator corresponding to the response of the application resolution report. In this manner, the unanswered portions of the customer query are addressed by the administrator, thus reducing the need for additional communication initiated by the client.

FIG. 2B shows a flowchart for performing the neural network algorithm in accordance with one or more embodiments of the invention. The method shown in FIG. 2B may be performed by, for example, an application upgrade management system (e.g., 100, FIG. 1). Other components of the system illustrated in FIG. 1 may perform the method of FIG. 2B without departing from the invention.

In step 220, a masking operation is performed on the application resolution report to obtain a masked application resolution report. In one or more embodiments of the invention, the masking operation includes obscuring a portion of the words in the application resolution report. The selection of words to be obscured may be, for example, random. A ratio of the words to be masked may be a predetermined value. In one or more embodiments of the invention, the obscuring includes replacing the masked words with an indeterminate string of characters that may not be used for prediction in step 224. The obscuring may be further applied to the corresponding tokens (e.g., word tokens, segment tokens, position tokens, etc.) of the masked words.

In step 222, a phrase separation is performed for each phrase in the masked application resolution report to obtain a set of phrases. In one or more embodiments of the invention, the phrase separation includes separating the phrase into multiple portions of words (e.g., phrases) based on a prediction of related words. For example, for words determined to correspond to other nearby (e.g., relative to the position token of the words) words, they may be grouped into a phrase. The words in each phrase may include any combination of masked words and non-masked words. The prediction of the groupings of words may be based on the phrase prediction model discussed below.

In step 224, a next phrase prediction is performed on the set of phrases using a phrase prediction model to obtain a predicted set of phrases. In one or more embodiments of the invention, the next phrase prediction is a process for applying the phrase prediction model to the set of phrases generated in step 222 and outputting a determination about the placement of the phrases in the application resolution report. For example, a pair of phrases may be input into the phrase prediction model, and the output may be a determination about whether one phrase immediately follows a previous phrase. Such application of phrase pairs may be repeated any number of times for any combination of phrases in the set of phrases.

In step 226, the phrase prediction model is updated using the application resolution report and the predicted set of phrases. In one or more embodiments of the invention, the phrase prediction model analyses the prediction of each phrase pair to the actual result in the application resolution report (e.g., the non-masked version) to determine an accuracy of the predictions. The comparison of the predicted outputs and the expected phrase pairs may be used to improve the phrase prediction model. Such improvement may result in the updated phrase prediction model.

In step 228, a vector representation is updated. In one or more embodiments of the invention, the vector representation includes a set of vectors each corresponding to a word in the application resolution report. The vector may be generated by performing a weighted average of a collection of word tokens in its corresponding phrase. A weight value may be applied to each word in the application resolution report, and the sum of the weighted values may be applied to the vector. The weight values may be based on the relationship of each associated word to the word of the corresponding vector. The relationship may be based on, for example, their closeness in position, whether the words are in the same phrase (or a nearby phrase), and/or any other relationship factor without departing from the invention. Because the phrase prediction model is used to perform the phrase separation, the phrases may be updated in each iteration of the phrase prediction model, and, as such, each iteration of step 228 may generate a different version of the vector representation.

In step 230, a determination is made about whether a sufficient number of neural network layers are applied. In one or more embodiments of the invention, a neural network layer includes performing one iteration of steps 220 to 228. In one or more embodiments of the invention, the determination is based on a configuration of the neural network algorithm as determined by an entity managing the application resolution report manager. The sufficient number of neural network layers may be determined prior to the implementation of the neural network algorithm. If a sufficient number of neural network layers is performed, the method ends following step 230; otherwise, the method proceeds to step 220.

Example

Figure 3:
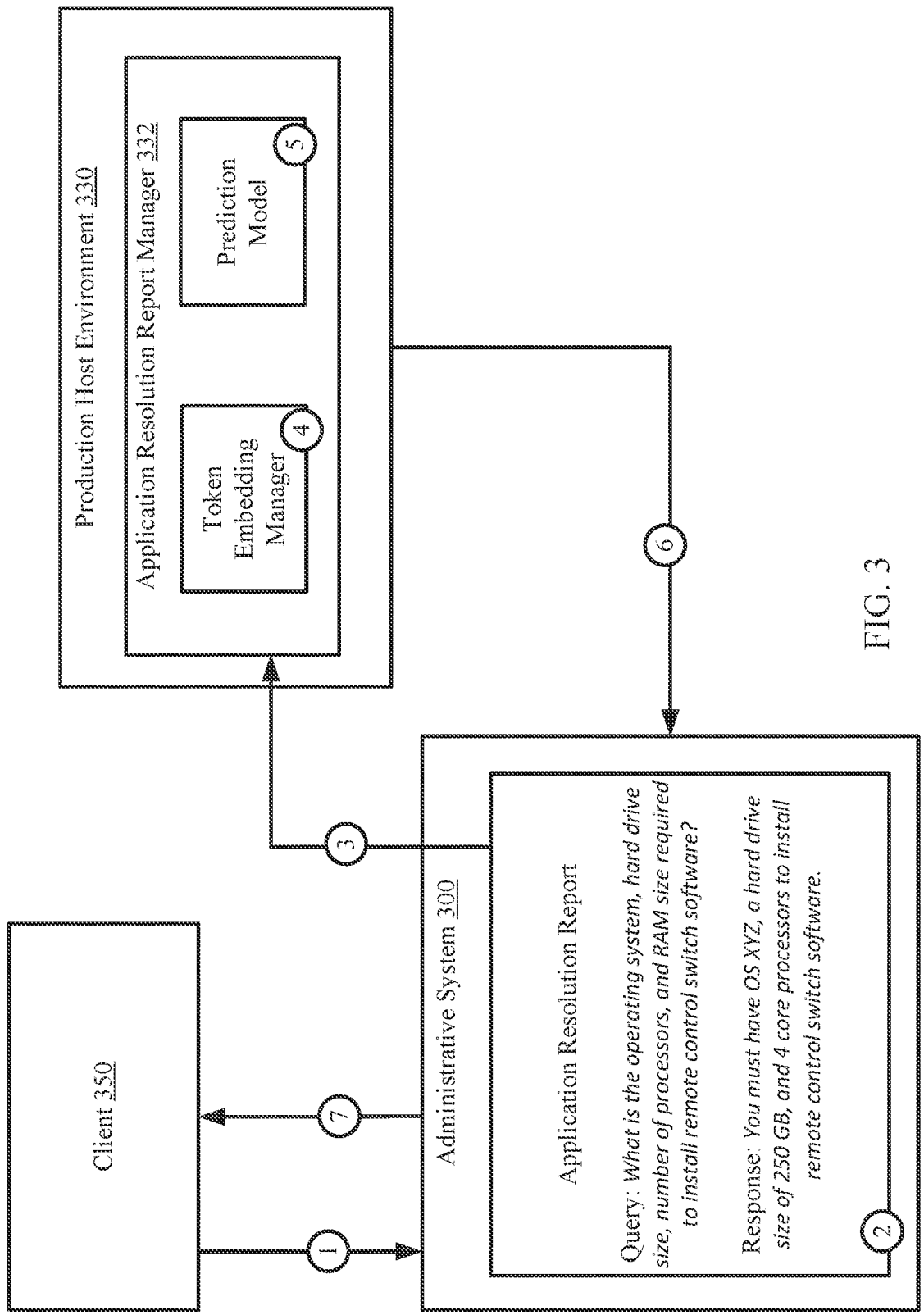
FIG. 3 shows an example in accordance with one or more embodiments of the invention.

The following section describes an example. The example, illustrated in FIG. 3, is not intended to limit the invention and is independent from any other examples discussed in this application. Turning to the example, consider a scenario in which a client communicates a customer query with an administrative system.

FIG. 3 shows an example system in accordance with one or more embodiments of the invention. For the sake of brevity, not all components of the example system may be illustrated. The example system includes a client (350), a production host environment (330), and an administrative system (300).

At a first point in time, the client (350) sends a query that includes the following message: "What is the operating system, hard drive size, number of processors, and RAM size required to install remote control switch software?" [1]. The customer query may be sent to the administrative system (300), operated by a technical support specialist, may generate the following response: "You must have OS XYZ, a hard drive size of 250 GB, and 4 core processors to install remote control switch software" [2]. Prior to sending the response to the client, the query and the response (collectively referred to as the application resolution report) is sent to an application resolution report manager (332) of the production host environment (330) [3].

The application resolution report manager (332) performs the method of FIG. 2A to generate a set of tokens for each word (e.g., "What", "is", "the", etc.) in the application resolution report in addition to a "[CSP]" word positioned before the word "What" and a "[SEP]" word positioned before the word "You". The set of tokens includes a word token for each word that corresponds to a numerical value. The set of tokens further includes segment tokens that specify the segment corresponding to the word (e.g., "response" or "query"). Further, the set of tokens includes position tokens that each correspond to the position of the words. In this example, the word "[CSP]" corresponds to a position token of "1", the word "What" corresponds to the position token of "2", the word "is" corresponds to the position token of "3", etc. [4]

Following the generation of the set of tokens, a neural network algorithm is applied to the set of tokens. Specifically, the neural network algorithm includes performing 12 iterations of a masking operation, a phrase separation, a phrase prediction model update, and an update to a vector representation corresponding to the words in the application resolution report [5]. Following the generation of the final iteration of the vector representation, a set of start scores and end scores are generated using the vectors generated and the identified phrases. The start and end scores are used to identify a portion of the query that remains unanswered. The identified portion includes the words "RAM" and "size".

The identified unanswered portion of the customer query is provided to the administrative system (300) as a notification to be viewed by the technical support specialist [6]. The technical support specialist, in response to obtaining the notification, updates the response and further specifies that the required RAM size is 4 GB. The updated response is provided to the client (350). In this manner, the customer query is fully answered, thus reducing the need for the client (350) to send additional communication with the administrative system (300).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention reduce the operational cost of customer communication with technical support specialists. Specifically, embodiments of the invention reduce the required frequency in which a customer communicates with the technical specialists to resolve issues. Because technical support specialists may not perfectly resolve a customer query in a first attempt, embodiments of the invention may analyze the response by technical support specialist to such customer queries to identify any unanswered portions of the customer queries. Results of such analysis (e.g., the identified unanswered portions) may be used to notify the technical support specialist of the unanswered portion, which may enable the technical support specialist to remediate this before the customer has to send additional communication.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing an application in a production host environment, the method comprising:
    obtaining, by an application resolution report manager of the production host, an application resolution report from an administrative system, wherein the application resolution report comprises a customer query and a response,
        wherein the customer query is associated with information about the application,
        wherein the customer query is generated using a client device, and
        wherein the response is generated using the administrative system;
    applying a neural network algorithm on a set of tokens associated with the application resolution report to obtain a vector representation of the application resolution report,
        wherein applying the neural network algorithm comprises:
            performing a first masking operation on the application resolution report by obscuring a random portion of words in the application report to obtain a masked application resolution report,
            performing a phrase separation on the masked application resolution report to obtain a set of phrases,
            performing a next phrase prediction on the set of phrases using a phrase prediction model to obtain a predicted set of phrases,
            updating the phrase prediction model using the predicted set of phrases and the application resolution report to obtain an updated phrase prediction model by analyzing a pair comprising one of the predicted set of phrases and a corresponding phrase of the set of phrases to determine an accuracy of the phrase prediction model and to improve the phrase prediction model, and
            based on the updated phrase prediction model, updating a vector representation to obtain a second vector representation, wherein the first vector representation is based on the application resolution report and wherein the vector representation is the second vector representation;
    performing a probability analysis on each vector in the vector representation;
    based on the probability analysis, identifying an unanswered portion of the application resolution report; and
    in response to the unanswered portion of the application resolution report, performing a query resolution, wherein the query resolution comprises providing the unanswered portion to the administrative system.

2. The method of claim 1, wherein each vector in a set of vectors in the first vector representation corresponds to a word in the application resolution report.

3. The method of claim 1, further comprising:
    after updating the first vector representation, making a determination that a sufficient number of neural network layers have not been applied;
    based on the determination, performing a second masking operation on the application resolution report to obtain a second masked application resolution report;
    performing a second phrase separation on the second masked application resolution report to obtain a second set of phrases;
    performing a second next phrase prediction on the second set of phrases using the updated phrase prediction model to obtain a second predicted set of phrases;
    updating the updated phrase prediction model using the second predicted set of phrases and the application resolution report to obtain a second updated phrase prediction model; and
    based on the second updated phrase prediction model, updating the second vector representation to obtain a third vector representation,
    wherein the vector representation is the third vector representation and not the second vector representation.

4. The method of claim 1, further comprising:
    performing a token embedding on each word in the application resolution report to obtain the set of tokens.

5. A non-transitory computer readable medium comprising computer readable program code, which when executed by a computer processor enables the computer processor to perform a method for managing applications, the method comprising:
    obtaining, by an application resolution report manager of the production host, an application resolution report from an administrative system, wherein the application resolution report comprises a customer query and a response,
        wherein the customer query is associated with information about the application,
        wherein the customer query is generated using a client device, and
        wherein the response is generated using the administrative system;
    applying a neural network algorithm on a set of tokens associated with the application resolution report to obtain a vector representation of the application resolution report,
        wherein applying the neural network algorithm comprises:
            performing a first masking operation on the application resolution report by obscuring a random portion of words in the application report to obtain a masked application resolution report,
            performing a phrase separation on the masked application resolution report to obtain a set of phrases, performing a next phrase prediction on the set of phrases using a phrase prediction model to obtain a predicted set of phrases, updating the phrase prediction model using the predicted set of phrases and the application resolution report to obtain an updated phrase prediction model by analyzing a pair comprising one of the predicted set of phrases and a corresponding phrase of the set of phrases to determine an accuracy of the phrase prediction model and to improve the phrase prediction model, and based on the updated phrase prediction model, updating a first vector representation to obtain a second vector representation, wherein the first vector representation is based on the application resolution report, wherein the vector representation is the second vector representation;

performing a probability analysis on each vector in the vector representation;

based on the probability analysis, identifying an unanswered portion of the application resolution report; and in response to the unanswered portion of the application resolution report, performing a query resolution, wherein the query resolution comprises providing the unanswered portion to the administrative system.

6. The non-transitory computer readable medium of claim 5, wherein each vector in a set of vectors in the first vector representation corresponds to a word in the application resolution report.

7. The non-transitory computer readable medium of claim 5, further comprising:

after updating the first vector representation, making a determination that a sufficient number of neural network layers have not been applied;

based on the determination, performing a second masking operation on the application resolution report to obtain a second masked application resolution report;

performing a second phrase separation on the second masked application resolution report to obtain a second set of phrases;

performing a second next phrase prediction on the second set of phrases using the updated phrase prediction model to obtain a second predicted set of phrases;

updating the updated phrase prediction model using the second predicted set of phrases and the application resolution report to obtain a second updated phrase prediction model; and based on the second updated phrase prediction model, updating the second vector representation to obtain a third vector representation, wherein the vector representation is the third vector representation and not the second vector representation.

8. The non-transitory computer readable medium of claim 5, further comprising:

performing a token embedding on each word in the application resolution report to obtain the set of tokens.

9. A system comprising:

a processor; and memory comprising instructions, which when executed by the processor, perform a method comprising:

obtaining, by an application resolution report manager of the production host, an application resolution report from an administrative system, wherein the application resolution report comprises a customer query and a response, wherein the customer query is associated with information about the application, wherein the customer query is generated using a client device, and wherein the response is generated using the administrative system;

applying a neural network algorithm on a set of tokens associated with the application resolution report to obtain a vector representation of the application resolution report, wherein applying the neural network algorithm comprises:

performing a first masking operation on the application resolution report by obscuring a random portion of words in the application report to obtain a masked application resolution report;

performing a phrase separation on the masked application resolution report to obtain a set of phrases;

performing a next phrase prediction on the set of phrases using a phrase prediction model to obtain a predicted set of phrases;

updating the phrase prediction model using the predicted set of phrases and the application resolution report to obtain an updated phrase prediction model by analyzing a pair comprising one of the predicted set of phrases and a corresponding phrase of the set of phrases to determine an accuracy of the phrase prediction model and to improve the phrase prediction model; and based on the updated phrase prediction model, updating a first vector representation to obtain a second vector representation, wherein the first vector representation is based on the application resolution report, wherein the vector representation is the second vector representation;

performing a probability analysis on each vector in the vector representation;

based on the probability analysis, identifying an unanswered portion of the application resolution report; and in response to the unanswered portion of the application resolution report, performing a query resolution, wherein the query resolution comprises providing the unanswered portion to the administrative system.

10. The system of claim 9, wherein each vector in a set of vectors in the first vector representation corresponds to a word in the application resolution report.

11. The system of claim 9, further comprising:

after updating the first vector representation, making a determination that a sufficient number of neural network layers have not been applied;

based on the determination, performing a second masking operation on the application resolution report to obtain a second masked application resolution report;

performing a second phrase separation on the second masked application resolution report to obtain a second set of phrases;

performing a second next phrase prediction on the second set of phrases using the updated phrase prediction model to obtain a second predicted set of phrases;

updating the updated phrase prediction model using the second predicted set of phrases and the application resolution report to obtain a second updated phrase prediction model; and based on the second updated phrase prediction model, updating the second vector representation to obtain a third vector representation,
wherein the vector representation is the third vector representation and not the second vector representation.

* * * * *